United States Patent
Thumpudi et al.

(10) Patent No.: US 10,148,871 B2
(45) Date of Patent: Dec. 4, 2018

(54) ADVANCED RAW CONVERSION TO PRODUCE HIGH DYNAMIC RANGE, WIDE COLOR GAMUT OUTPUT

(71) Applicant: Microsoft Technology Licensing, LLC, Redmond, WA (US)

(72) Inventors: Naveen Thumpudi, Redmond, WA (US); Sandeep Kanumuri, Redmond, WA (US); Jesse Hakanen, Tampere (FI); Matthew R. Wozniak, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

(21) Appl. No.: 15/372,089

(22) Filed: Dec. 7, 2016

(65) Prior Publication Data
US 2018/0160038 A1 Jun. 7, 2018

(51) Int. Cl.
*H04N 5/232* (2006.01)
*H04N 1/64* (2006.01)
*H04N 9/04* (2006.01)
*H04N 5/235* (2006.01)
*H04N 1/60* (2006.01)
*H04N 9/64* (2006.01)

(52) U.S. Cl.
CPC ....... *H04N 5/23229* (2013.01); *H04N 1/6008* (2013.01); *H04N 1/644* (2013.01); *H04N 1/646* (2013.01); *H04N 1/648* (2013.01); *H04N 5/2355* (2013.01); *H04N 9/045* (2013.01); *H04N 9/646* (2013.01)

(58) Field of Classification Search
CPC .................................................. H04N 5/23229
See application file for complete search history.

(56) References Cited

U.S. PATENT DOCUMENTS

| 7,800,629 | B2 | 9/2010 | Lee et al. |
| 7,821,548 | B2 | 10/2010 | Kalevo |
| 8,358,319 | B2 | 1/2013 | Cote et al. |
| 8,760,533 | B2 | 6/2014 | Safai |
| 9,106,936 | B2 | 8/2015 | Wegener |
| 2004/0190770 | A1* | 9/2004 | Spaulding ............ H04N 1/6058 382/167 |
| 2004/0196381 | A1 | 10/2004 | Matsuzaka |

(Continued)

FOREIGN PATENT DOCUMENTS

WO 2015128603 A1 9/2015

OTHER PUBLICATIONS

Shoe, Laura, "8 bit, 12 bit, 14 bit, 16 bit—What Does It Really Mean to Digital Photographers?", http://laurashoe.com/2011/08/09/8-versus-16-bit-what-does-it-really-mean/, Published on: Aug. 2011, 18 pages.

(Continued)

*Primary Examiner* — Christopher K Peterson
(74) *Attorney, Agent, or Firm* — Arent Fox LLP

(57) ABSTRACT

Described are examples for generating high dynamic range (HDR)/wide color gamut (WCG) output from an image sensor. A raw red, green, blue (RGB) image obtained by the image sensor can be received. A plurality of color transform operations can be applied to the raw RGB image to generate a HDR/WCG image. The HDR/WCG image can be stored in a memory, displayed on a display, transmitted to another device, etc.

20 Claims, 5 Drawing Sheets

(56) References Cited

U.S. PATENT DOCUMENTS

| | | | |
|---|---|---|---|
| 2005/0052469 A1* | 3/2005 | Crosby | G06F 17/30905 |
| | | | 345/619 |
| 2008/0012953 A1 | 1/2008 | Yang et al. | |
| 2009/0147018 A1* | 6/2009 | Takei | H04N 5/23293 |
| | | | 345/590 |
| 2013/0321677 A1 | 12/2013 | Cote et al. | |
| 2015/0312593 A1 | 10/2015 | Akeley et al. | |
| 2017/0214914 A1* | 7/2017 | Sato | H04N 19/176 |

OTHER PUBLICATIONS

"GPU RAW Processor for Camera Applications", http://web.archive.org/web/20160315191121/http:/www.fastcompression.com/products/raw/gpu-raw-processor.htm, Published on: Mar. 15, 2016, 2 pages.

\* cited by examiner

ADVANCED RAW CONVERSION TO PRODUCE HIGH DYNAMIC RANGE, WIDE COLOR GAMUT OUTPUT

BACKGROUND

Many computing devices are equipped with cameras for digitally capturing images, video, etc. for storing on the computing device or other repositories for subsequent viewing. Cameras are typically capable of capturing high quality raw images, but often down-convert the raw images to 8-bit red, green, blue (RGB) (e.g., in the form of a joint photographic experts group (JPEG)) for processing by a computing device, and/or display on an associated display compatible for displaying 8-bit JPEGs. As camera processing capabilities increase, so do technologies for photo capture and display. Additional standards have been proposed for displaying high definition images, such as ultra high definition (UHD), wide color gamut (WCG), high dynamic range 10-bit (HDR10), and high dynamic range 12-bit (HDR12), which can be capable of producing 10-bit to 14-bit images.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a method for generating high dynamic range (HDR)/wide color gamut (WCG) output from an image sensor is provided. The method includes receiving a raw red, green, blue (RGB) image obtained by the image sensor, applying a plurality of color transform operations to the raw RGB image to generate a HDR/WCG image, and storing the HDR/WCG image in a memory.

In another example, a device for generating HDR/WCG output is provided. The device includes an image sensor configured to capture one or more raw RGB images, a memory storing one or more parameters or instructions for converting the one or more raw RGB images to HDR/WCG images, and at least one processor coupled to the memory. The at least one processor is configured to receive a raw RGB image obtained by the image sensor, apply a plurality of color transform operations to the raw RGB image to generate a HDR/WCG image, and store the HDR/WCG image in the memory.

In another example, a computer-readable medium, including code executable by one or more processors for generating HDR/WCG output from an image sensor is provided. The code includes code for receiving a raw RGB image obtained by the image sensor, applying a plurality of color transform operations to the raw RGB image to generate a HDR/WCG image, and storing the HDR/WCG image in a memory.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to a converting raw red, green, blue (RGB) image to high dynamic range (HDR) and/or wide color gamut (WCG) outputs (e.g., outputs of 10-bits or higher) at least in part by applying multiple color transform operations to the raw RGB image. In an example, one or more wide-gamut RGB color space transform operations can be applied to the raw RGB image to generate the HDR/WCG output. Additionally, the raw RGB image can be converted to a YCbCr color space, where Y represents a luminance, Cb represents a blue-difference chroma component, and Cr represents a red-difference chroma component, to generate the high definition output. Additionally, gamma correction can be applied as a last step to the high definition output (e.g., after one or more of a sharpening operation, a color noise (or other types of noise) reduction operation, or a scaling operation) in generating the high definition output for storing in a memory, displaying on a display, etc.

In an example, the RGB image may be captured by an image sensor (also referred to herein as a "camera"), obtained from a digital negative (DNG) container, etc. For instance, the RGB image may be obtained from a legacy image sensor configured for capturing images to produce as a standard dynamic range (SDR) digital images. As described herein, however, the raw RGB conversion for producing SDR images can be modified to apply the multiple color transform operation to produce high definition images at 10-bit, 12-bit, 14-bit, etc., output, which may include at least one of an ultra high definition (UHD), WCG, HDR 10-bit (HDR10), HDR 12-bit (HDR12), etc., output. Thus, high definition output can be generated for raw RGB images from current image sensors (e.g., cameras integrated in mobile devices, tablets, laptops, etc., external cameras couplable via a wired or wireless interface, such as universal serial bus (USB) cameras, local area network (LAN) cameras, Bluetooth cameras, etc.) without requiring modification of image sensor hardware.

Figure 1:
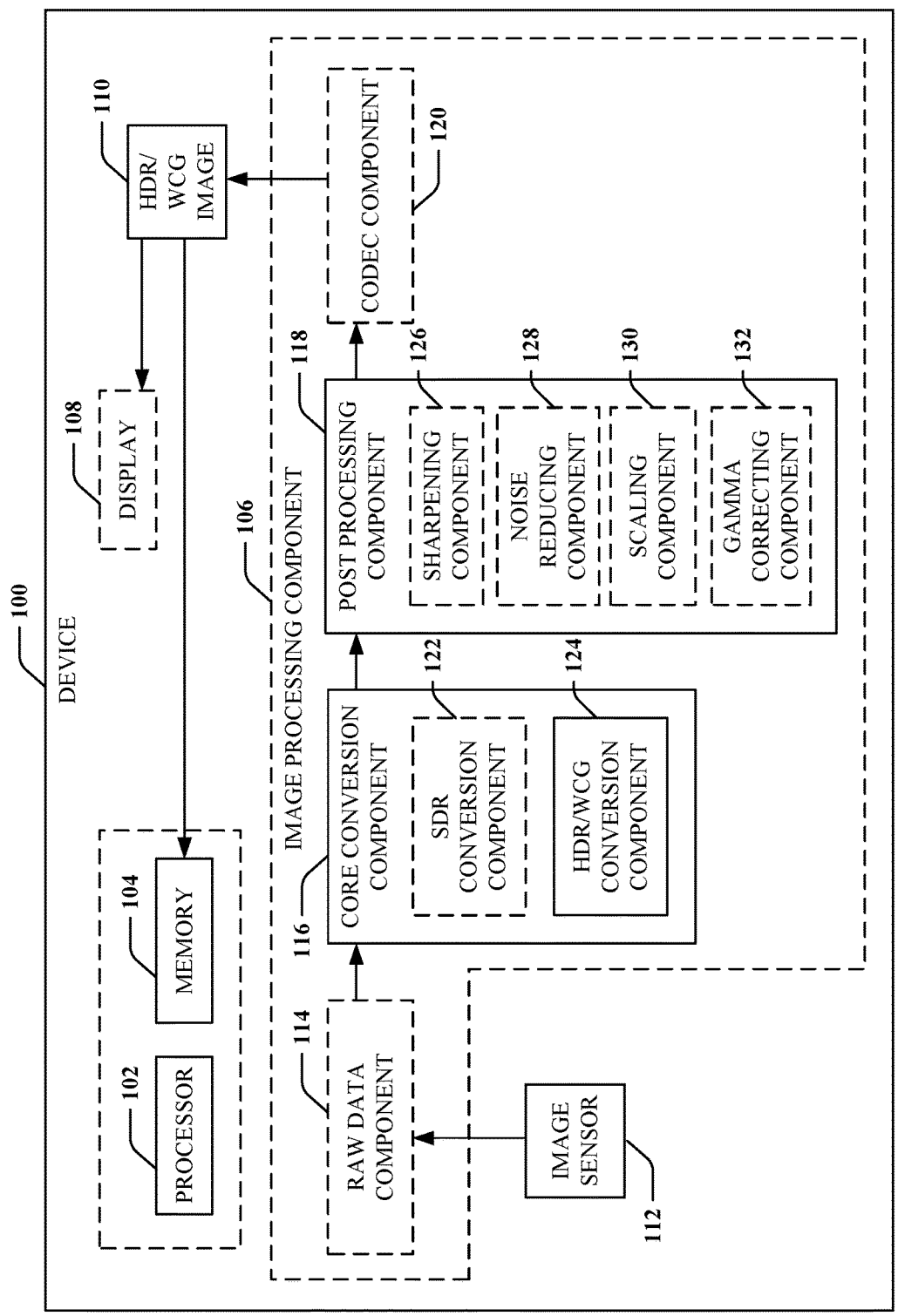
FIG. 1 is a schematic diagram of an example of a device for converting raw red, green, blue (RGB) images to high dynamic range (HDR), wide color gamut (WCG) images.
Figure 2:
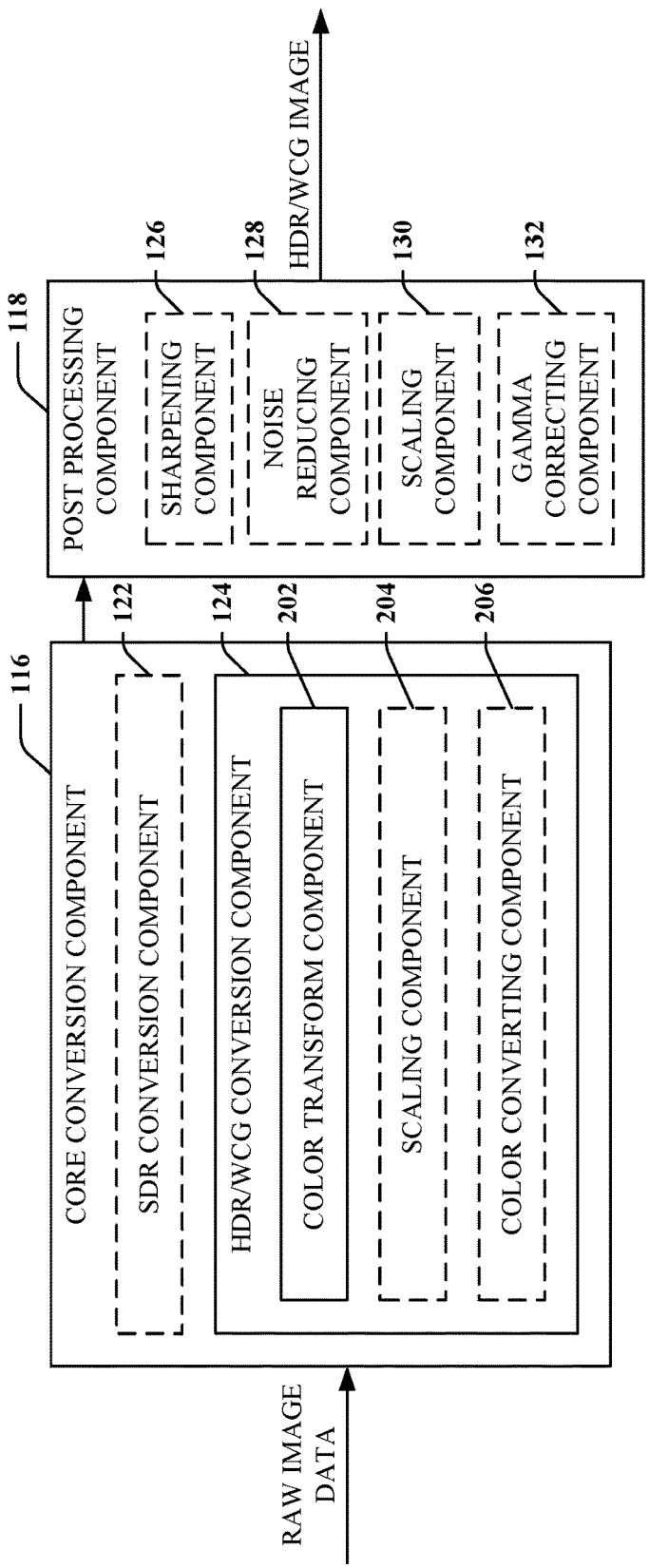
FIG. 2 is a schematic diagram of an example of a core conversion component and post processing component for converting RGB images and applying post processing steps thereto.
Figure 3:
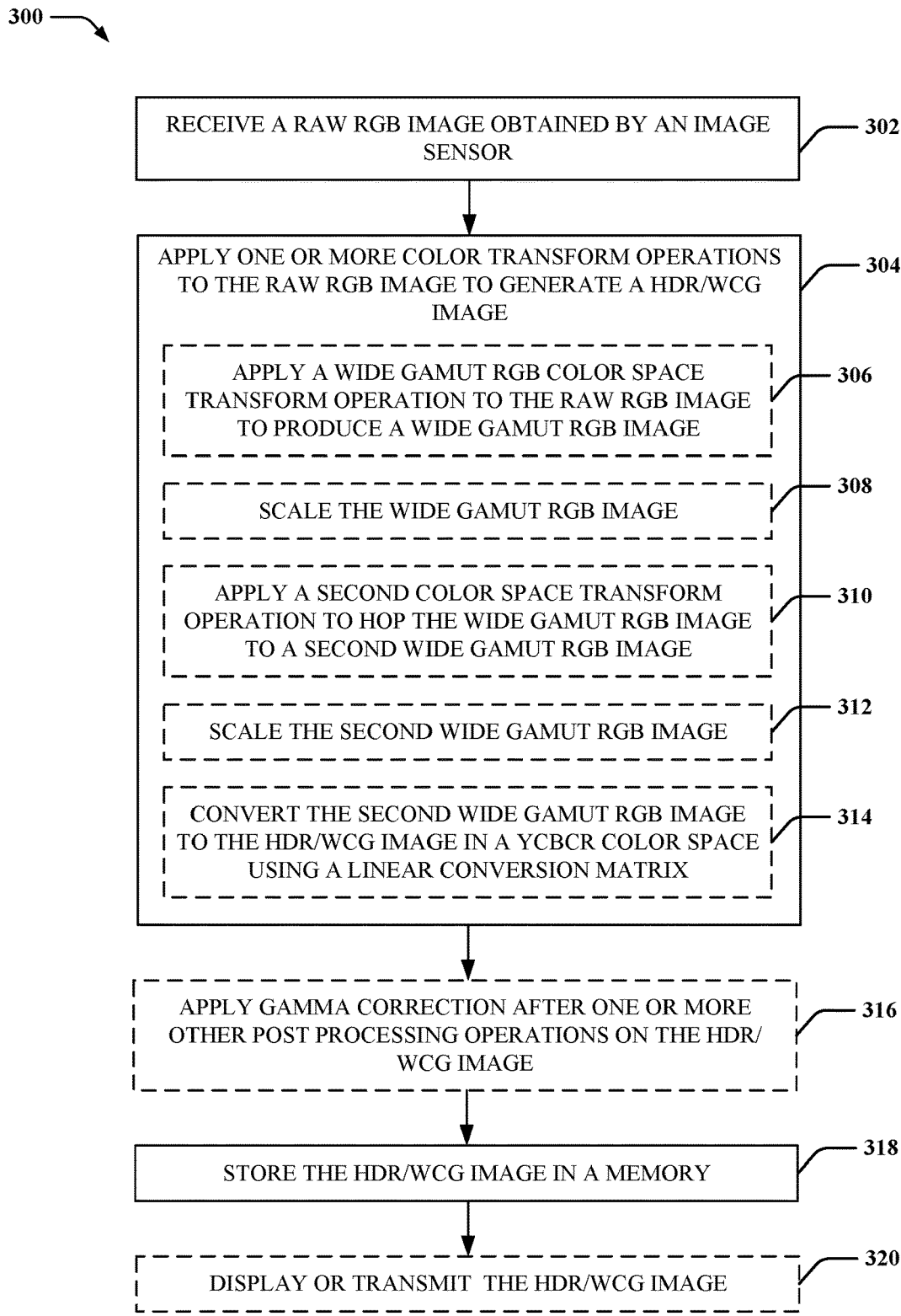
FIG. 3 is a flow diagram of an example of a method for converting RGB images to HDR/WCG images.
Figure 4:
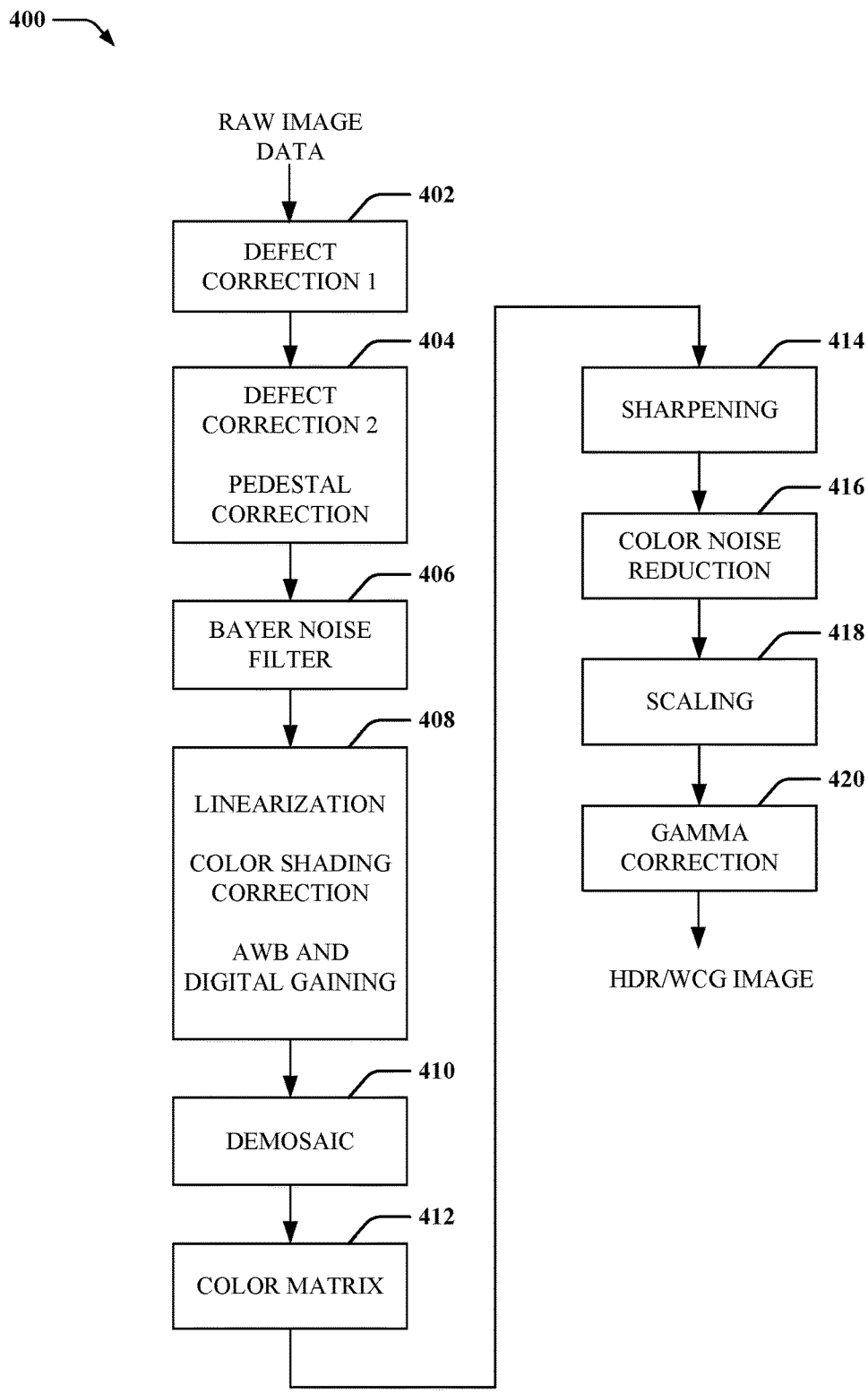
FIG. 4 is a diagram of an example of a process for converting RGB images to HDR/WCG images.

Turning now to FIGS. 1-5, examples are depicted with reference to one or more components and one or more methods that may perform the actions or operations described herein, where components and/or actions/operations in dashed line may be optional. Although the operations described below in FIGS. 3-4 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a device 100 (e.g., a computing device) that can convert raw RGB images from an image sensor into HDR/WCG images. In an example, device 100 can include a processor 102 and/or memory 104 configured to execute or store instructions or other parameters related to providing an image processing component 106, as described further herein. For example, processor 102 and memory 104 may be separate components communicatively coupled by a bus (e.g., on a motherboard or other portion of a computing device, on an integrated circuit, such as a system on a chip (SoC), etc.), components integrated within one another (e.g., processor 102 can include the memory 104 as an on-board component), and/or the like. Memory 104 may store instructions, parameters, data structures, etc. for use/execution by processor 102 to perform functions described herein. Device 100 can optionally include a display 108 for displaying HDR/WCG images 110 produced by the image processing component 106. For example, the display 108 may include a liquid crystal display (LCD), plasma display, etc., which may also include a touch interface.

In an example, device 100 can also include an image sensor 112 for generating image data for processing by image processing component 106. Image sensor 112 may include a camera, such as an RGB camera. Image sensor 112 may be configured for providing raw RGB output that may be optimized for generating SDR images, in one example. Image sensor 112 may be a camera internal to the device 100 (e.g., connected to processor 102 and/or memory 104 via an internal bus of the device 100), external to the device 100 and coupled to the device via one or more wired or wireless interfaces, etc. In an example, image sensor 112 can generate a raw RGB image, and can provide the raw RGB image to image processing component 106 for producing an HDR/WCG image 110. In an example, image processing component 106 can be implemented by a processor 102, instructions in memory 104, an image signal processor (not shown), etc., to receive raw RGB image input and generate the HDR/WCG image 110.

For example, image processing component 106 may include one or more of a raw data component 114 for obtaining raw RGB image data from an image sensor 112, which may be in a Bayer pattern, and may include a 10-bit, 12-bit, etc. or higher bit depth raw Bayer pattern RGB image, a core conversion component 116 for converting the raw RGB image to a 10-bit, 12-bit, etc. RGB or YCbCr image, a post processing component 118 for applying one or more post processing steps to the image, and/or a codec component 120 for compressing the image into one or more encoded formats. For example, core conversion component 116 can optionally include an SDR conversion component 122 for converting the raw RGB image into a SDR image, and a HDR/WCG conversion component 124 for converting the raw RGB image into an HDR/WCG image, as described further herein. Additionally, post processing component 118 may optionally include one or more of a sharpening component 126 to apply a sharpening process to the HDR/WCG image, a noise reducing component 128 for reducing color noise (or other types of noise) in the HDR/WCG image, a scaling component 130 for scaling the HDR/WCG image, and/or a gamma correcting component 132 for applying a gamma correction to the HDR/WCG image.

FIG. 2 is a schematic diagram of an example of a core conversion component 116 and a post processing component 118, as described herein. For example, core conversion component 116 can receive raw image data, and can convert the raw image data to SDR images via SDR conversion component 122 (e.g., using conventional SDR conversion mechanisms) and/or HDR/WCG image via HDR/WCG conversion component 124. For instance, HDR/WCG conversion component 124 can include a color transform component 202 for applying multiple color transform operations to the raw image data to generate HDR/WCG images, an optional scaling component 204 for applying one or more scaling operations to the image data (e.g., between color transform operations or otherwise), and an optional color converting component 206 for converting a color space of the HDR/WCG image to one or more other color spaces. In any case, core conversion component 116 can provide the resulting HDR/WCG image to post processing component 118 for performing one or more post processing steps, as described further herein.

FIG. 3 is a flowchart of an example of a method 300 for converting raw RGB images to HDR/WCG images. For example, method 300 can be performed by a device 100 and/or one or more components (e.g., an image processing component 106, processor 102, image signal processor, etc.) thereof to facilitate converting the raw RGB images.

In method 300, at action 302, a raw RGB image obtained by an image sensor can be received. In an example, raw data component 114, e.g., in conjunction with processor 102, memory 104, image processing component 106, etc., can receive the raw RGB image obtained by the image sensor (e.g., image sensor 112). For example, raw data component 114 may receive the raw RGB image from the image sensor 112, from a driver of the image sensor 112 (e.g., a driver operating on an operating system along with the image processing component 106), and/or the like. For example, image sensor 112 can be a camera that captures the raw RGB image as a still image, a frame of a video, etc. In another example, image sensor 112 can provide the raw RGB image to another component that can store the raw RGB image in a DNG container, which can be provided to the raw data component 114. In any case, raw data component 114 can obtain the raw RGB image as captured by the image sensor 112. For example, the raw RGB image from image sensor 112 and/or as stored in a DNG container can be captured in a Bayer pattern, where a given image sample may be 10-bit, 12-bit, or more bits, etc. having red, green, or blue in a specific format (color of phosphor, luminosity, nominal white point, etc.).

In method 300, at action 304, one or more color transform operations can be applied to the raw RGB image to generate an HDR/WCG image. In an example, HDR/WCG conversion component 124, e.g., in conjunction with processor 102, memory 104, image processing component 106, etc., can apply the one or more color transform operations to the raw RGB image to generate the HD image. For example, the one or more color transform operations can include a plurality of color transform operations that can be different from a color transform used to produce an 8-bit SDR image, and can be applied to each pixel of the raw RGB image to produce an HDR/WCG image, such as a 10-bit, 12-bit, etc. image, which can include a UHD, WCG, HDR10, HDR12, or similar output. In an example, the plurality of color transform operations can allow HDR/WCG conversion component 124 to produce an HDR/WCG image 110 having a color space specified by BT.2020 in 10-bit, 12-bit, etc. Moreover, for example, the plurality of color transform operations can allow HDR/WCG conversion component 124 to produce an HDR/WCG image 110 having a luminance of 1,000 or more candela per square meter (cd/m$^2$, or "nits").

In one example, color transform component 202 can compute color transform operation matrices as if there is a single transformation from source to destination. For example, the raw RGB input can be a RGB Bayer pattern having phosphors represented as camera RGB. This can facilitate computing transformation to one or more RGB color spaces, as described below.

In an example, in applying the plurality of color transform operations at action 304, optionally at action 306, a wide-gamut RGB color space transform operation can be applied to the raw RGB image to produce a wide-gamut RGB image. In an example, color transform component 202, e.g., in conjunction with processor 102, memory 104, image processing component 106, HDR/WCG conversion component 124, etc. can apply the wide-gamut RGB color space transform operation to the raw RGB image to produce the wide-gamut RGB image. For example, applying the wide-gamut RGB color space transform can include multiplying a matrix representing the raw RGB image by an encoding primary. For example, color transform component 202 can apply a ProPhoto RGB color space transform operation to the raw RGB image to produce the wide-gamut RGB image. For example, the ProPhoto RGB color space transform operation can include an encoding primary with the following International Commission on Illumination (CIE) primaries and white point (or similar values):

| Color | CIE x | CIE y |
|---|---|---|
| Red | 0.7347 | 0.2653 |
| Green | 0.1596 | 0.8404 |
| Blue | 0.0366 | 0.0001 |
| White (D50) | 0.3457 | 0.3585 |

In an example, ProPhoto RGB color space transform operation can support a luminance range of 160 to 640 nits. In one example, color transform component 202 can utilize a luminance of 142 nits, which can provide for substantially linear luminance. Moreover, for example, the color transform component 202 can apply the ProPhoto RGB color space transform operation to output a 10-bit image, a 12-bit image, etc. In one example, the image output by the ProPhoto RGB color space transform operation may be based on whether the raw RGB image is 10-bit, 12-bit, etc.

In an example, in applying the plurality of color transform operations at action 304, optionally at action 308, the wide-gamut RGB image can be scaled. In an example, scaling component 204, e.g., in conjunction with processor 102, memory 104, image processing component 106, HDR/WCG conversion component 124, etc. can scale the wide-gamut RGB image, e.g., using a chromatic adaptation mechanism. For example, in scaling the wide-gamut RGB image, HDR/WCG conversion component 124 can apply a Bradford scaling mechanism to transform the RGB image into a cone response domain, which can include determining the 3×3 matrix [M] that could be used to convert a source color in XYZ coordinates, $$\begin{bmatrix} XS \\ YS \\ ZS \end{bmatrix},$$

into a destination color in XYZ coordinates, $$\begin{bmatrix} XD \\ YD \\ ZD \end{bmatrix},$$

through $$\begin{bmatrix} XD \\ YD \\ ZD \end{bmatrix} = [M] \begin{bmatrix} XS \\ YS \\ ZS \end{bmatrix}.$$

The value of [M] is obtained as:

$$[M] = [M_A]^{-1} \begin{bmatrix} \rho_D/\rho_S & 0 & 0 \\ 0 & \gamma_D/\gamma_S & 0 \\ 0 & 0 & \beta_D/\beta_S \end{bmatrix} M_A$$

where [$M_A$] and [$M_A$]$^{-1}$ are constant matrices:

| [$M_A$] | | | [$M_A$]$^{-1}$ | | |
|---|---|---|---|---|---|
| 0.895100 | 0.266400 | −0.161400 | 0.9869929 | −0.1470543 | 0.1599627 |
| −0.750200 | 1.713500 | 0.036700 | 0.4323053 | 0.5183603 | 0.0492912 |
| 0.038900 | −0.068500 | 1.029600 | −0.0085287 | 0.0400428 | 0.9684867 | and, $$\begin{bmatrix} \rho S \\ \gamma S \\ \beta S \end{bmatrix}$$

is a vector representing source white $$\begin{bmatrix} X_{WS} \\ Y_{WS} \\ Z_{WS} \end{bmatrix}$$

in cone coordinates, computed as:

$$\begin{bmatrix} \rho S \\ \gamma S \\ \beta S \end{bmatrix} = [M_A] \begin{bmatrix} X_{WS} \\ Y_{WS} \\ Z_{WS} \end{bmatrix},$$

and, $$\begin{bmatrix} \rho D \\ \gamma D \\ \beta D \end{bmatrix}$$

is a vector representing destination white $$\begin{bmatrix} X_{WD} \\ Y_{WD} \\ Z_{WD} \end{bmatrix}$$

in cone coordinates, computed as:

$$\begin{bmatrix} \rho D \\ \gamma D \\ \beta D \end{bmatrix} = [M_A] \begin{bmatrix} X_{WD} \\ Y_{WD} \\ Z_{WD} \end{bmatrix}.$$

In an example, in applying the plurality of color transform operations at action 304, optionally at action 310, a second color space transform operation can be applied to hop the wide-gamut RGB image to a second wide-gamut RGB image. In an example, color transform component 202, e.g., in conjunction with processor 102, memory 104, image processing component 106, HDR/WCG conversion component 124, etc. can apply the second color space transform operation to hop the wide-gamut RGB image to the second wide-gamut RGB image. For example, applying the second color space transform can include multiplying a matrix representing the raw RGB image by an encoding primary. For example, color transform component 202 can apply a BT.2020 color space transform operation to the wide-gamut RGB image to produce the second wide-gamut RGB image. For example, the BT.2020 RGB color space transform operation can include an encoding primary with the following International Commission on Illumination (CIE) primaries and white point (or similar values):

| Color | CIE x | CIE y |
|---|---|---|
| Red | 0.708 | 0.292 |
| Green | 0.170 | 0.797 |
| Blue | 0.131 | 0.046 |
| White (D50) | 0.3217 | 0.3290 |

In an example, color transform component 202 can use other color space transform operations in addition or alternatively to those described above. For example, color transform component 202 may alternatively apply the BT.2020 RGB color space transform operation to the raw RGB image, and then apply the ProPhoto RGB color space transform operation. Moreover, for example, the color transform component 202 can apply the BT.2020 RGB color space transform operation to output a 10-bit image, a 12-bit image, etc. In one example, the image output by the BT.2020 RGB color space transform operation may be based on whether the wide-gamut RGB image is 10-bit, 12-bit, etc.

In an example, in applying the plurality of color transform operations at action 304, optionally at action 312, the second wide-gamut RGB image can be scaled. In an example, scaling component 204, e.g., in conjunction with processor 102, memory 104, image processing component 106, HDR/WCG conversion component 124, etc. can scale the second wide-gamut RGB image, e.g., using a chromatic adaptation mechanism. For example, in scaling the second wide-gamut RGB image, HDR/WCG conversion component 124 can apply a Bradford scaling mechanism, as described. In one example, scaling component 204 can apply scaling to the RGB image after each, or one or more of, the color space transform operations. Also, in an example, color transform component 202 can apply additional color transform operations (and/or scaling) to the RGB image to produce the HDR/WCG image.

In an example, in applying the plurality of color transform operations at action 304, optionally at action 314, the second wide-gamut RGB image (or a subsequent wide-gamut RGB image) can be converted to the HDR/WCG image in a YCbCr color space using a linear conversion matrix. In an example, color converting component 206, e.g., in conjunction with processor 102, memory 104, image processing component 106, HDR/WCG conversion component 124, etc. can convert the second wide-gamut RGB image (or a subsequent wide-gamut RGB image) to the HDR/WCG image in the YCbCr color space using the linear conversion matrix. For example, color converting component 206 can apply the linear conversion matrix to the second wide-gamut RGB image by applying the linear conversion matrix based on the following constants (or similar values):

KB=0.0593, KR=0.2627, KG=0.678 where KB, KR, and KG are constants used in color conversion process of each RGB triplet:

$$\begin{pmatrix} Y \\ Cb \\ Cr \end{pmatrix} = \begin{pmatrix} KR & 1-KR-KB & KB \\ -KR/(2-2KB) & -(1-KR-KB)/(2-2KB) & 0.5 \\ 0.5 & -(1-KR-KB)/(2-2KR) & -KB/(2-2KR) \end{pmatrix} \begin{pmatrix} R \\ G \\ B \end{pmatrix} + \begin{pmatrix} 1 \\ 0.5 \\ 0.5 \end{pmatrix}$$

This can convert the pixels of the second wide-gamut RGB image (or a subsequent wide-gamut RGB image) to the linear YCbCr color space (sometimes represented as YcCbcCrc space), in one example.

In method 300, optionally at action 316, gamma correction can be applied after one or more other post processing operations on the HDR/WCG image. In an example, gamma correcting component 132, e.g., in conjunction with processor 102, memory 104, image processing component 106, post processing component 118, etc. can apply the gamma correction after one or more other post processing operations on the HDR/WCG image 110 (e.g., as provided in the wide-gamut RGB or YCbCr color space). For example, gamma correcting component 132 can apply the gamma correction operation as a last post processing operation on the HDR/WCG image 110. Specifically, for example, sharpening component 126 can perform a sharpening operation to sharpen the HDR/WCG image (e.g., by modifying one or more pixels thereof), noise reducing component 128 can perform a color noise (or other types of noise) reduction on the HDR/WCG image (e.g., by modifying one or more pixels thereof), and/or scaling component 130 can scale the HDR/WCG image using one or more scaling operations (e.g., Bradford scaling). After the post processing component 118 performs these operation(s), gamma correcting component 132 can apply gamma correction to the HD image as a last step before encoding the image using a codec. Moreover, for example, gamma correcting component 132 can apply a Society of Motion Picture & Television Engineers (SMPTE) ST-2084 (e.g., Dolby perceptual quantizer) gamma correction, a hybrid log gamma correction, a linear gamma correction, and/or the like.

In method 300, at action 318, the HDR/WCG image can be stored in a memory. In an example, image processing component 106, e.g., in conjunction with processor 102, memory 104, etc., can store the HDR/WCG image 110 in the memory (e.g., memory 104). For example, image processing component 106 can store the HDR/WCG image as a compressed or uncompressed image, in local or remote memory/storage (e.g., memory 104 or another memory on device 100 or another device), in a container format such as JPEG-extended range (JPEG-XR) or high efficiency video coding (HEVC), etc. In one example, image processing component 106 may store the HDR/WCG image 110 in memory 104 or another memory for displaying by display 108 and/or a display of another device. As described, the display 108 may be capable of displaying HDR/WCG output, and thus can display the HDR/WCG image 110 as a UHD, RCG, HDR10, HDR12, etc., image as generated by the image processing component 106, as described above. In another example, image processing component 106 may store the HDR/WCG image 110 in memory 104 or another memory for transmitting to another device (e.g., for display and/or storage by the other device). Thus, in an example, device 100 can transmit the HDR/WCG image 110 to another device (e.g., via one or more networks).

In this regard, in method 300, optionally at action 320, the HDR/WCG image can be displayed or transmitted. In an example, image processing component 106, display 108, etc., e.g., in conjunction with processor 102, memory 104, etc., can display the HDR/WCG image 110 on display 108, and/or transmit the HDR/WCG image 110 to another device (e.g., via a transceiver communicating with one or more nodes of a wired or wireless network).

FIG. 4 illustrates an example of a specific raw RGB image conversion process 400 that can be employed by an image processing component 106, one or more components thereof, as described herein, an image signal processor, etc. for converting raw image data to an HDR/WCG image. In one implementation, the defect correction can be implemented in two stages. For example, dead pixel and hot pixels in raw image data input that are isolated may be masked in defect correction 1 through a simple process (e.g., by using the values of one or more neighboring pixels). Dead and hot pixels that are in clusters may be masked in defect correction 2 stage, along with pedestal correction (e.g., for spatially varying black level in sensor data and any clipping in the sensor data) in a more sophisticated spatial process 404. The output can then be provided to a Bayer noise filter 406 to produce a de-noised Bayer pattern for the image data. This stage of noise filter can be effective as noise estimation may be more accurate before other stages of filtering that can leak noise across color channels or smear spatially. The de-noised Bayer pattern can be output for performing linearization, color shading correction, and auto white balance (AWB) and digital gaining 408 processes. Then a demosiac 410 process (sometimes called color filter array interpolation) can be performed to reconstruct a full resolution color image from the Bayer pattern image.

After the demosaic 410 process, one or more color matrix 412 processes can be applied to the full color image to generate the HDR/WCG image, as described above. For example, a plurality of color transform operations, scalings, color space conversions, etc. can be performed in producing the HDR/WCG output (e.g., as a UHD, WCG, HDR10, HDR12 image). As described, one or more of a sharpening 414 process, color noise (or other types of noise) reduction 416 process and/or scaling 418 process can be performed as post processing steps to the HDR/WCG output. Then, a gamma correction 420 process can be performed as a last step in producing the HDR/WCG output.

Figure 5:
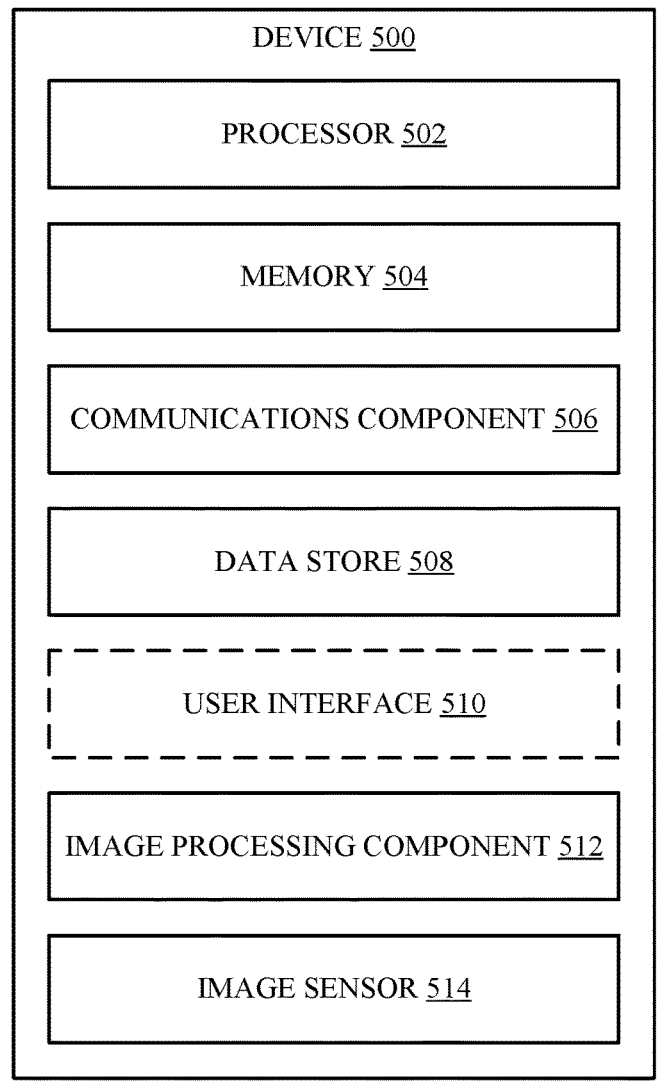
FIG. 5 is a schematic diagram of an example of a device for performing functions described herein.

FIG. 5 illustrates an example of device 500 including additional optional component details as those shown in FIG. 1. In one aspect, device 500 may include processor 502, which may be similar to processor 102 for carrying out processing functions associated with one or more of components and functions described herein. Processor 502 can include a single or multiple set of processors or multi-core processors. Moreover, processor 502 can be implemented as an integrated processing system and/or a distributed processing system.

Device 500 may further include memory 504, which may be similar to memory 104 such as for storing local versions of operating systems (or components thereof) and/or applications being executed by processor 502, such as image processing component 512, etc., related instructions, parameters, etc. Memory 504 can include a type of memory usable by a computer, such as random access memory (RAM), read only memory (ROM), tapes, magnetic discs, optical discs, volatile memory, non-volatile memory, and any combination thereof.

Further, device 500 may include a communications component 506 that provides for establishing and maintaining communications with one or more other devices, parties, entities, etc. utilizing hardware, software, and services as described herein. Communications component 506 may carry communications between components on device 500, as well as between device 500 and external devices, such as devices located across a communications network and/or devices serially or locally connected to device 500. For example, communications component 506 may include one or more buses, and may further include transmit chain components and receive chain components associated with a wireless or wired transmitter and receiver, respectively (or collectively a transceiver), operable for interfacing with external devices.

Additionally, device 500 may include a data store 508, which can be any suitable combination of hardware and/or software, that provides for mass storage of information, databases, and programs employed in connection with aspects described herein. For example, data store 508 may be or may include a data repository for operating systems (or components thereof), applications, related parameters, etc., not currently being executed by processor 502. In addition, data store 508 may be a data repository for image processing component 512, and/or one or more other components of the device 500.

Device 500 may optionally include a user interface component 510 operable to receive inputs from a user of device 500 and further operable to generate outputs for presentation to the user. User interface component 510 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 510 may include one or more output devices, including but not limited to a display, a speaker, a haptic feedback mechanism, a printer, any other mechanism capable of presenting an output to a user, or any combination thereof.

Device 500 may additionally include an image processing component 512, which may be similar to image processing component 106, for processing one or more raw RGB images from an image sensor 514 as an HD image, and/or an image sensor 514, which may be similar to image sensor 112 for capturing one or more images (e.g., as a still image, video, etc.) as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for generating high dynamic range (HDR)/wide color gamut (WCG) output from an image sensor, comprising:
    receiving a raw red, green, blue (RGB) image obtained by the image sensor;
    applying, by a processor, a plurality of color transform operations to the raw RGB image to generate a HDR/WCG image, wherein applying the plurality of color transform operations comprises:
        applying a wide-gamut RGB color space transform operation to the raw RGB image to produce a wide-gamut RGB image;
        applying a BT.2020 transform operation to hop the wide-gamut RGB image to a second wide-gamut RGB image; and
        converting the second wide-gamut RGB image to the HDR/WCG image in a YCbCr color space using a linear conversion matrix; and
    storing, by the processor, the HDR/WCG image in a memory.

2. The method of claim 1, further comprising at least one of scaling the wide-gamut RGB image before applying the second color space transform operation, or scaling the second wide-gamut RGB image before converting to the HDR/WCG image.

3. The method of claim 1, wherein the wide-gamut RGB color space transform operation is a ProPhoto RGB transform operation.

4. The method of claim 1, wherein the wide-gamut RGB color space transform operation outputs a 10-bit image, the second color space transform operation outputs a 10-bit image, and the HDR/WCG image is a 10-bit image.

5. The method of claim 1, wherein the wide-gamut RGB color space transform operation outputs a 12-bit image, the second color space transform operation outputs a 12-bit image, and the HDR/WCG image is a 12-bit image.

6. The method of claim 1, further comprising applying a gamma correction operation to the HDR/WCG image after applying one or more of a sharpening operation, a color noise (or other types of noise) reduction operation, or a scaling operation to the HDR/WCG image.

7. The method of claim 1, wherein receiving the raw RGB image comprises receiving a digital negative (DNG) container including the raw RGB image.

8. The method of claim 1, further comprising at least one of displaying, on a display, or transmitting, to another device, the HDR/WCG image from the memory.

9. A device for generating high dynamic range (HDR) and wide color gamut (WCG) output, comprising:
    an image sensor configured to capture one or more raw red, green, blue (RGB) images;
    a memory for storing one or more parameters or instructions for converting the one or more raw RGB images to HDR/WCG images; and
    at least one processor coupled to the memory, wherein the at least one processor is configured to:
        receive a raw RGB image obtained by the image sensor;

apply a plurality of color transform operations to the raw RGB image to generate a HDR/WCG image, wherein applying the plurality of color transform operations comprises:
   applying a wide-gamut RGB color space transform operation to the raw RGB image to produce a wide-gamut RGB image;
   applying a BT.2020 transform operation to hop the wide-gamut RGB image to a second wide-gamut RGB image; and
   converting the second wide-gamut RGB image to the HDR/WCG image in a YCbCr color space using a linear conversion matrix; and
store the HDR/WCG image in the memory.

10. The device of claim 9, wherein the at least one processor is further configured to at least one of scale the wide-gamut RGB image before applying the second color space transform operation, or scale the second wide-gamut RGB image before converting to the HDR/WCG image.

11. The device of claim 9, wherein the wide-gamut RGB color space transform operation is a ProPhoto RGB transform operation.

12. The device of claim 9, wherein the wide-gamut RGB color space transform operation outputs a 10-bit image, the second color space transform operation outputs a 10-bit image, and the HDR/WCG image is a 10-bit image.

13. The device of claim 9, wherein the wide-gamut RGB color space transform operation outputs a 12-bit image, the second color space transform operation outputs a 12-bit image, and the HDR/WCG image is a 12-bit image.

14. The device of claim 9, wherein the at least one processor is further configured to apply a gamma correction operation to the HDR/WCG image after applying one or more of a sharpening operation, a color noise (or other types of noise) reduction operation, or a scaling operation to the HDR/WCG image.

15. The device of claim 9, wherein the at least one processor is configured to receive the raw RGB image as a digital negative (DNG) container including the raw RGB image.

16. The device of claim 9, further comprising at least one of a display for displaying the HDR/WCG image from the memory, or a transceiver for transmitting, to another device, the HDR/WCG image from the memory.

17. A non-transitory computer-readable medium, comprising code executable by one or more processors for generating high dynamic range (HDR)/wide color gamut (WCG) output from an image sensor, the code comprising code for:
   receiving a raw red, green, blue (RGB) image obtained by the image sensor;
   applying a plurality of color transform operations to the raw RGB image to generate a HDR/WCG image, wherein applying the plurality of color transform operations comprises:
      applying a wide-gamut RGB color space transform operation to the raw RGB image to produce a wide-gamut RGB image;
      applying a BT.2020 transform operation to hop the wide-gamut RGB image to a second wide-gamut RGB image; and
      converting the second wide-gamut RGB image to the HDR/WCG image in a YCbCr color space using a linear conversion matrix; and
   storing the HDR/WCG image in a memory.

18. The non-transitory computer-readable medium of claim 17, further comprising code for at least one of scaling the wide-gamut RGB image before applying the second color space transform operation, or scaling the second wide-gamut RGB image before converting to the HDR/WCG image.

19. The non-transitory computer-readable medium of claim 17, wherein the wide-gamut RGB color space transform operation is a ProPhoto RGB transform operation.

20. The non-transitory computer-readable medium of claim 17, wherein the wide-gamut RGB color space transform operation outputs a 10-bit image, the second color space transform operation outputs a 10-bit image, and the HDR/WCG image is a 10-bit image.

* * * * *